United States Patent [19]
Berglund et al.

[11] Patent Number: 5,866,083
[45] Date of Patent: *Feb. 2, 1999

[54] HEAT EXCHANGER ADAPTED FOR THE PRODUCTION OF CARBON BLACK

[75] Inventors: Göran Berglund, Sandviken; Ulf Eriksson, Göteborg, both of Sweden

[73] Assignee: Edmeston AB, Goteborg, Sweden

[*] Notice: This patent issued on a continued prosecution application filed under 37 CFR 1.53(d), and is subject to the twenty year patent term provisions of 35 U.S.C. 154(a)(2).

[21] Appl. No.: 757,632

[22] Filed: Dec. 2, 1996

[30] Foreign Application Priority Data

Dec. 4, 1995 [SE] Sweden .................................. 9504344

[51] Int. Cl.$^6$ ...................................................... F28D 7/16
[52] U.S. Cl. .......................... 422/201; 422/150; 422/200; 422/202; 422/203; 165/82; 165/160
[58] Field of Search ................................... 422/200, 201, 422/150, 205, 202–204; 423/461, 449.1; 165/160, 134.1, 81–82

[56] References Cited

U.S. PATENT DOCUMENTS

| | | | |
|---|---|---|---|
| 1,816,850 | 8/1931 | Hurd | 165/160 |
| 2,000,653 | 5/1935 | Wilkinson | 165/82 |
| 4,418,748 | 12/1983 | Pouderoux et al. | 165/160 |
| 4,850,857 | 7/1989 | Obermuller | 422/204 |
| 5,219,535 | 6/1993 | Giacobbe et al. | 422/201 |
| 5,220,887 | 6/1993 | Hiddleston et al. | 165/82 |

*Primary Examiner*—Hien Tran
*Attorney, Agent, or Firm*—Burns, Doane, Swecker & Mathis, L.L.P.

[57] ABSTRACT

Carbon black is produced by burning a mixture of air and oil to produce hot gases and then conducting the hot gases through tubes extending through a chamber of a heat exchanger. Heat exchange air is conducted through the chamber in a direction opposite the direction of gas flow, in heat-exchange relationship with the tubes, to pre-heat the air. The pre-heated air is then mixed with the oil to be burned. Prior to entering the chamber, the air is conducted within a hollow section of the wall structure of the heat exchanger to transfer heat from a hot end of the wall structure toward a cooler end thereof.

7 Claims, 4 Drawing Sheets

HEAT EXCHANGER ADAPTED FOR THE PRODUCTION OF CARBON BLACK

BACKGROUND OF THE INVENTION

The present invention relates to a heat exchanger that may be used, e.g., for the production of carbon black. Further, the invention relates to a process for the production of carbon black and a plant including said heat exchanger for the realization of the process.

Carbon black is the term used for the pulverized forms of carbon which are produced by incomplete combustion or thermic degradation of natural gas or mineral oil. Depending upon the method of production, different types of carbon black arise, namely so called channel black, furnace black and pyrolysis black (also called thermal black).

Channel black is characterized by a lower pH, a higher content of volatile constituents and fewer chain-like structures between the particles. It has the smallest particle size of all materials produced in industry and its particles are within colloidal size range. Its major field of use is as a reinforcement material in rubber, where it improves both the wear resistance and the oil resistance of the rubber.

Thermal black consists of relatively coarser particles and is primarily used as a pigment. Furnace black, which has been produced from natural gas, has a medium size, while the furnace black produced from oil may occur within a broad range of controlled particle sizes and is particularly suitable for reinforcing synthetic rubber. Furnace black is by far the most important form of carbon black and is used to a considerably larger extent than the other two. Also the present invention relates specifically to this type of carbon black, which in the present application is referred to simply as just "carbon black".

Carbon black is commercialized in the form of a powder, or pellets or paste. The powder is kept in multi-walled paper bags or in lined barrels. Carbon black is used as an additive in rubber tries and other wear resistant rubber products. In plastics it is used as a reinforcing agent, as an opacifier, as a means for increasing the electrical conductivity and for absorbing ultraviolet light. Further, carbon black is used for instance in duplicating carbon, in ink ribbons for typewriters, in colour pigments and for influencing the weather.

A plant for the production of carbon black (i.e., of the type furnace black) depicted in FIGS. 1 and 2 is conventional, except for the support base 15 in FIG. 2. Incoming combustion air flows through a tube conduit or inlet 1 into the upper part of a tube heat exchanger 2, in which it is preheated before being combusted with oil in the burner 9 and the combustion reactor 3. The preheated air is passed into the combustion chamber via a conduit 5. Oil is added to said reactor via a tube conduit 4. The amount of air corresponds to about 50% of the stoichiometric amount of oxygen gas required for a complete combustion of the oil, whereby carbon black is formed. It is also possible to add water into the reactor 3, which has an impact on the quality of the final product. The mixture of suspended carbon black in the consumed combustion air is led away from the top of the heat exchanger via a conduit 6, through a normally water-cooled cooler 7 to a filter arrangement 8, conventionally equipped with textile bag filters. In this filter arrangement the carbon black is completely filtered off from the gas flow, which is then passed out through a nonreturn valve 1G for further purification in a plant 11 before it is exhausted into the ambient air via a chimney 12.

The construction of the heat exchanger 2 may be more clearly seen in FIG. 2. The heat exchanger is of the tube type, with a plurality of substantially vertical tubes 13. Inside these tubes rise the hot gases from the combustion, whereby they are cooled by the air that enters via the inlet 1 and passes outside the tubes 13 downwards towards the outlet 5, within a shell 14. The temperature at the inlet 1 of the tubes 13 may be about 1000° C. and the combustion air passing along the exterior of the tubes may be preheated to about 800° C. These conditions result in utmost severe stresses for the materials in the heat exchanger. The part of the heat exchanger that is submitted to the highest mechanical stress is the lower part of the shell, where the metal temperature may amount to about 900° C.

A measured temperature profile in the shell 14 is shown in the diagram in FIG. 4. At a simultaneous inner pressure of about 1 bar and a shell diameter of about 2000 mm, and a tower height of about 13 m, this implies that very thick metal walls have to be used since the strength of the material at these temperatures only is in the order of magnitude $5N/mm^2$. Instability may easily arise in the shell at downtimes, whereby the risk of buckling is imminent. A number of shut-downs because of bucklings have also occurred, with considerable costs as a consequence. Thus, there are strong reasons for wanting to decrease the temperature of the shell, thereby working under conditions where the strength in the shell is sufficiently high to avoid problems relative to instability.

An undesired process phenomenon that arises in the heat exchanger is that the tubes 13 may be fouled by carbon. Thus, the incoming air of ambient temperature or somewhat higher, cools the tube wall and the burnt gases, which are in equilibrium at the inlets of the tubes 13 and will therefore be excessively cooled on the inside of the tube, whereby carbon may be formed according to the Boudoir reaction $2CO \rightarrow C + CO_2$. Together with the carbon particles in the gas, the thus formed carbon contributes to the fouling. One way of reducing the tendency of fouling would be to diminish the degree of cooling of the gas, i.e., to operate with warmer tube walls. This could be achieved by preheating the air that flows into the conduit 1. However, then the lower part of the shell would become even hotter and the stress upon this part would thus be further accentuated.

Hence, a primary object of the present invention is to reduce the thermal stress upon the shell of a tube heat exchanger, in particular during the production of carbon black.

A second object of the present invention is to prevent foulings by carbon within the heat exchanger tubes.

Further objects of the present invention are to extend the useful life of the heat exchanger during the production of carbon black and to minimize the number of running disturbances in said exchanger.

Still another object of the present invention is to improve the efficiency of the heat exchanger.

SUMMARY OF THE INVENTION

These and further objects have been attained by a tube heat exchanger which comprises a cylindrical wall structure connected to first and second end walls for forming a chamber. A plurality of tubes extends longitudinally within the chamber from one of the end walls to the other end wall for conducting gasses. An air inlet and an air outlet communicate with the chamber for conducting heat exchange air to and from the chamber, respectively, the heat exchange air flowing in heat exchanging relationship with the tubes. The cylindrical wall structure is hollow and forms an air passage extending longitudinally from the inlet to the chamber, so that the heat exchange air is conducted in heat exchanging relationship with a section of the wall structure before contacting the tubes.

Preferably, the inlet communicates with the air passage adjacent the first end wall of the chamber, and the air passage communicates with the chamber adjacent the second end wall.

Preferably, the heat exchanger is utilized in an apparatus for the production of carbon black wherein an oil burner and a combustion reactor are provided for burning an air and oil mixture.

The invention also relates to a process for the production of carbon black wherein a mixture of air and oil is burned to generate combustion gases. The combustion gases are conducted within tubes extending from a first end to a second end of a chamber of a heat exchanger. Heat exchange air is passed through the chamber in heat exchanging relationship with the tubes to preheat the air. That preheated air constitutes the air which is mixed with the oil. Prior to contacting the tubes, the heat exchange air is conducted within a passage formed by a wall structure of the heat exchanger. The heat exchange air is introduced into the passage at a location adjacent the first end of the heat exchanger to transfer heat from that first end toward the second end of the heat exchanger.

BRIEF DESCRIPTION OF THE DRAWING

For illustrative but non-limiting purposes, the invention will now be further described with reference to the appended drawings, wherein.

BRIEF DESCRIPTION OF A PREFERRED EMBODIMENT OF THE INVENTION

Figure 1:
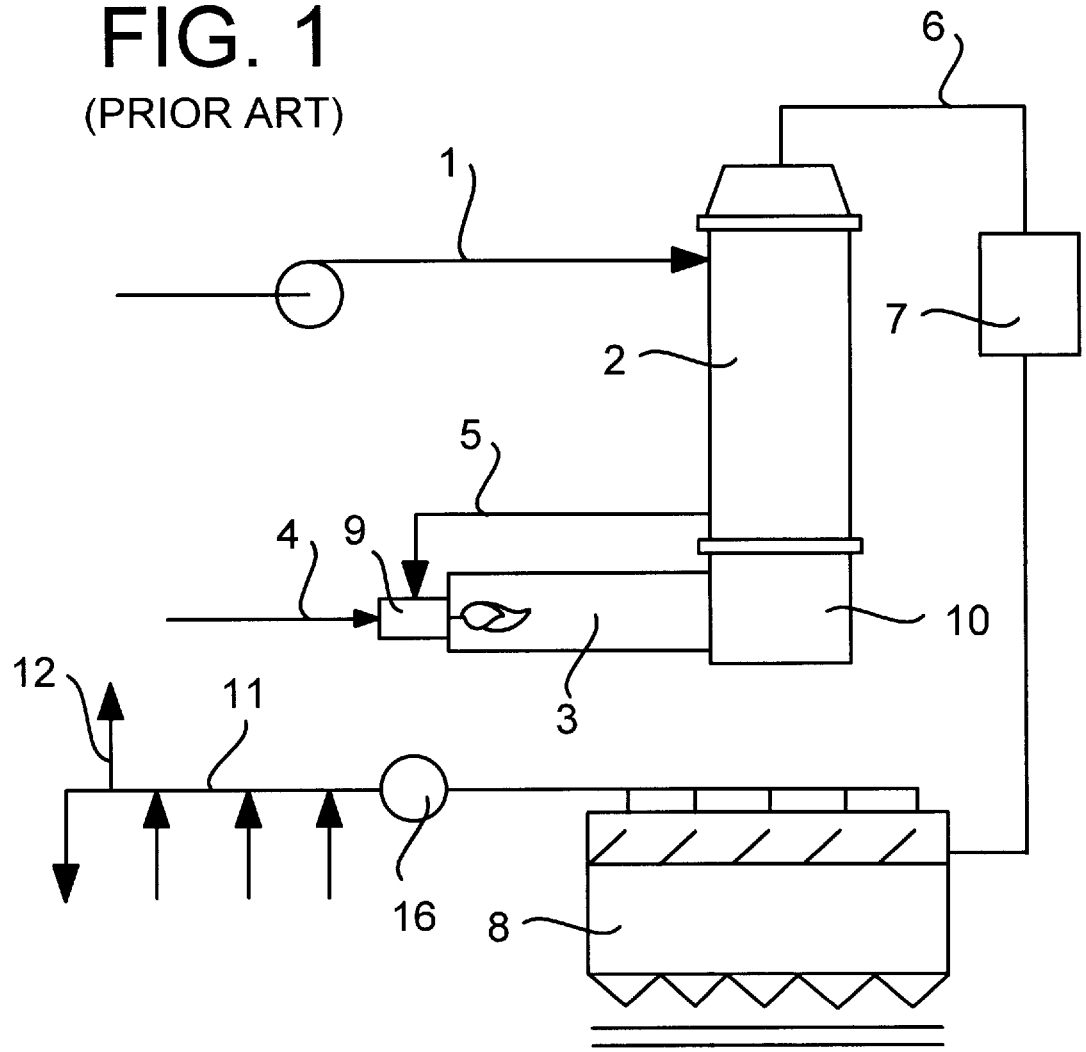
FIG. 1 shows schematically a conventional plant for the production of carbon black.

The heat exchanger according to the invention occupies the same place in the basic scheme according to FIG. 1 as the previously known heat exchanger. At the bottom it has an inlet 1' for inflowing combustion air (heat exchange air). The temperature of this air is suitably between the ambient temperature and about 100° C. The heat exchanger comprises a shell 14' of a substantially circular cross-section, which encloses a chamber 16. The shell typically has considerable dimensions, such as a diameter of about 2 m and a height of between 10 and 15 m, and encloses between 50 and 150 tubes 13'. The shell 14', as well as other parts of the heat exchanger, is formed of a fire-resistant stainless steel. At its top and at the bottom, the heat exchanger is delimited by substantially circular end walls 17 and 18, respectively, formed of a suitable insulating material, such as, e.g., a ceramic substance. In accordance with a preferred embodiment of the present invention, the lower end wall 18 carries a support manifold 15 having an inlet 19 and an outlet 20 for a cooling medium, suitably air, which is allowed to pass through the support manifold, in order to heat-insulate the heat exchanger as much as possible from the very hot evaporation chamber 10 (at about 1000° C.).

The heat exchanger tubes 13' extend substantially vertically through the whole chamber 16. These tubes have for instance a diameter of between 5 and 10 cm. At the bottom, they are welded in sleeves 21, while at the top they extend into tightening compensators or sleeves 22, which allow for a certain mobility in view of recurrent contractions and heat expansions, respectively, of the tubes. The gases that flow into the bottoms of the tubes 13' have a temperature of between 900° and 1100° C. while at the outlet of the tube they have cooled to between 500° and 800° C., normally about 650° C.

An essential feature of the present invention is that the heat exchanger has a second or inner shell wall 23 placed concentrically inside of the outer shell wall 14' to form an annular space 29 between the walls 14', 23. This inner shell wall is suitably placed on the support manifold 15, or if the latter is dispensed with, directly on the end wall 18. The shell wall 23 is solid, i.e., imperforate and impervious to gas flow. At its top, the inner wall 23 ends in the immediate proximity of the end wall 17, whereby a gap 24 is formed between the lower surface of the end wall 17 and the upper edge of the inner shell wall. In order to support and stabilize the inner shell wall, suitable rods (not shown) may be placed between the two shell walls. The use of such rods also makes possible the obtainment of a substantially uniform space 29 between the two shell walls along their entire height.

Mounted in the inner shell wall near the bottom thereof, is an outlet conduit 25 for the preheated combustion gases, which outlet conduit connects to the conduit 5 of FIG. 1. The outlet conduit 25 typically has a temperature of between 600° and 1000° C., usually around 800° C.

In order to distribute the incoming combustion air around the whole annular space 29, there is provided a shield 26 extending vertically across the height of the inlet 1', which shield is substantially cylindrical. Radially outside this shield, the outer shell 14' has an enlarged portion 27 for making space for the incoming gases received from the inlet 1'.

The incoming air received through the inlet 1' is distributed around the outside of the shield 26 and then it flows through an annular inlet opening 28 of the space 29 and enters the lower end of the cylindrical space 29, which may suitably be between 3 and 10 cm wide. As the air flows upwardly within the space 29, it cools the two shell walls, and thus is heated by the inner shell wall. When the air reaches the gap 24, it may have a temperature of between 150° and 400° C., for instance around 250° C. At its top, the outer shell wall can be shaped with a widened part 30 for decreasing the pressure drop when the air is diverted into a downwardly directed flow. When the air now reaches the tubes 13', it is already to a certain extent preheated, whereby the gases within the tubes do not become cooled to the same extent as with the prior art. Consequently, the problematic carbon foulings previously occurring within the tubes are avoided. Furthermore, the surprising advantage is obtained that the heat transfer on the outside of the tubes is improved by the fact that the air there, as already mentioned, has been preheated and, thereby, increased considerably in volume, which in turn results in a higher flow velocity. Finally, the preheated air exits through the outlet tube 25, which extends through aligned holes provided in the shield 26 and the inner wall 23, respectively.

Figure 2:
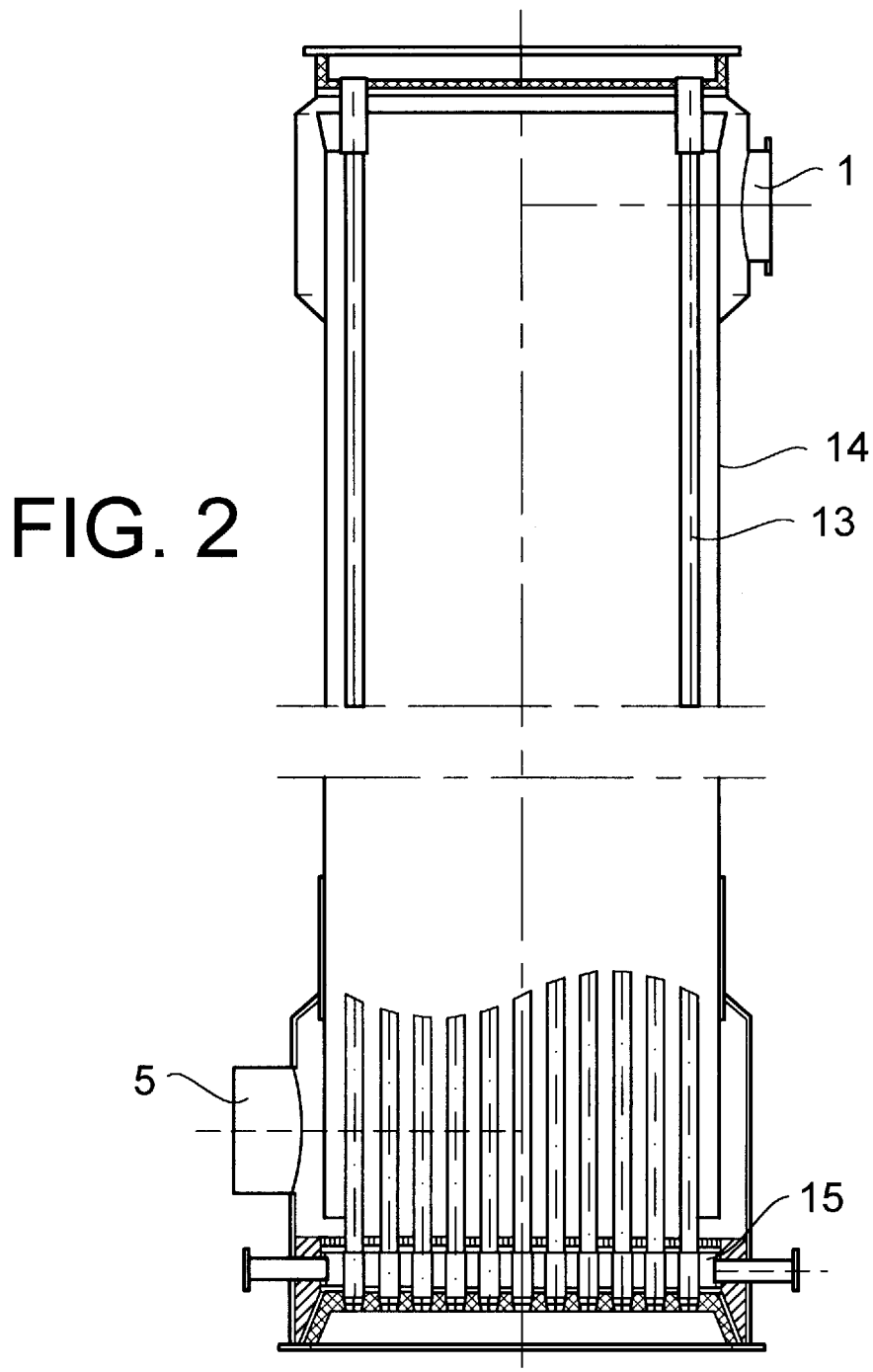
FIG. 2 shows a prior art heat exchanger (with the exception of support plate 15)
Figure 3:
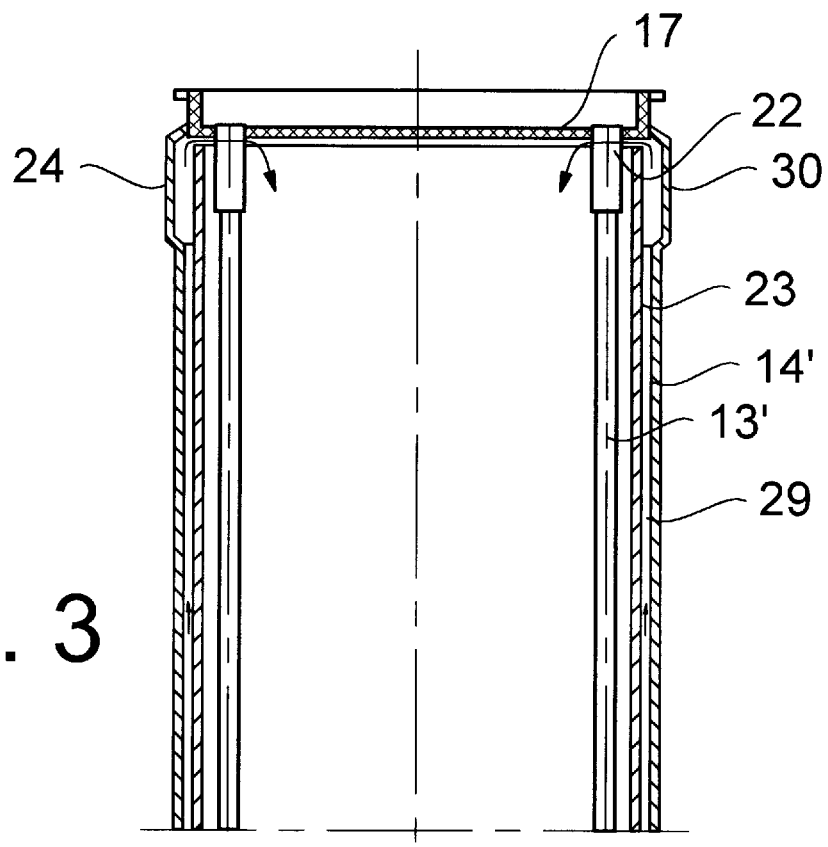
FIG. 3 shows sectional view of a heat exchanger according to the present invention.
Figure 3:
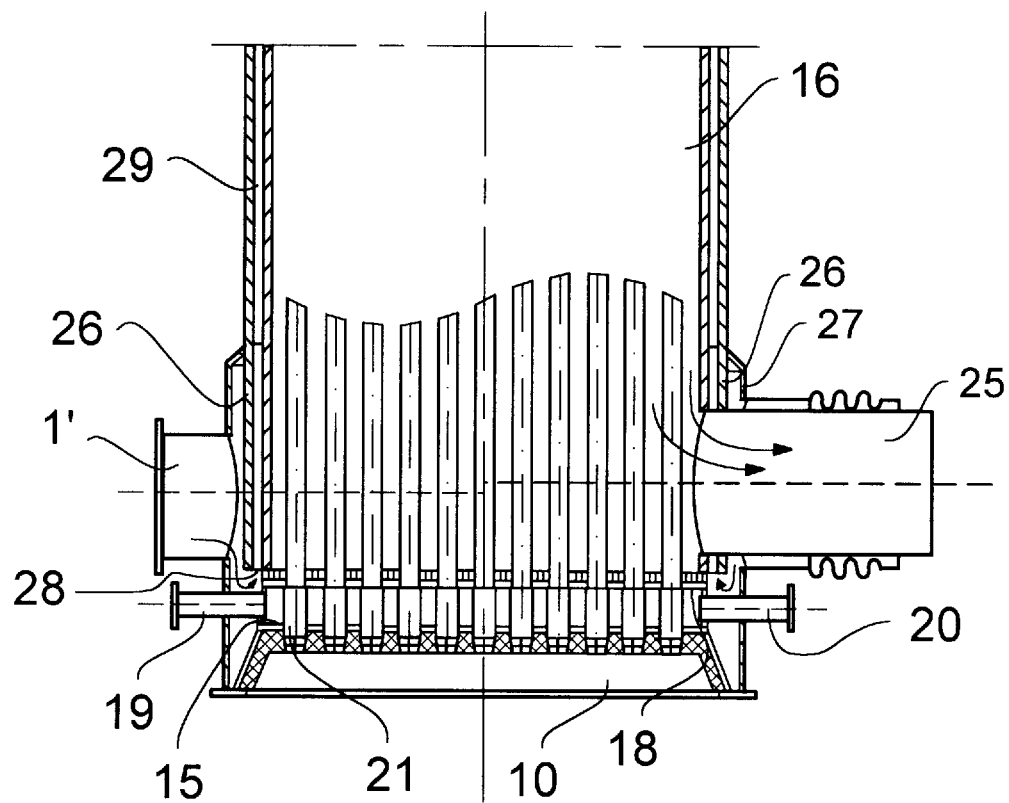

In comparison with the prior art heat exchanger disclosed in connection with FIG. 2, the exchanger according to the invention has made possible a considerably improved heat economy. Thus, with identical flows and temperatures, the temperature of the product gas in the conduit 6 has been increased considerably. Moreover, the necessity of insulating the outside of the heat exchanger has been drastically reduced.

Figure 4:
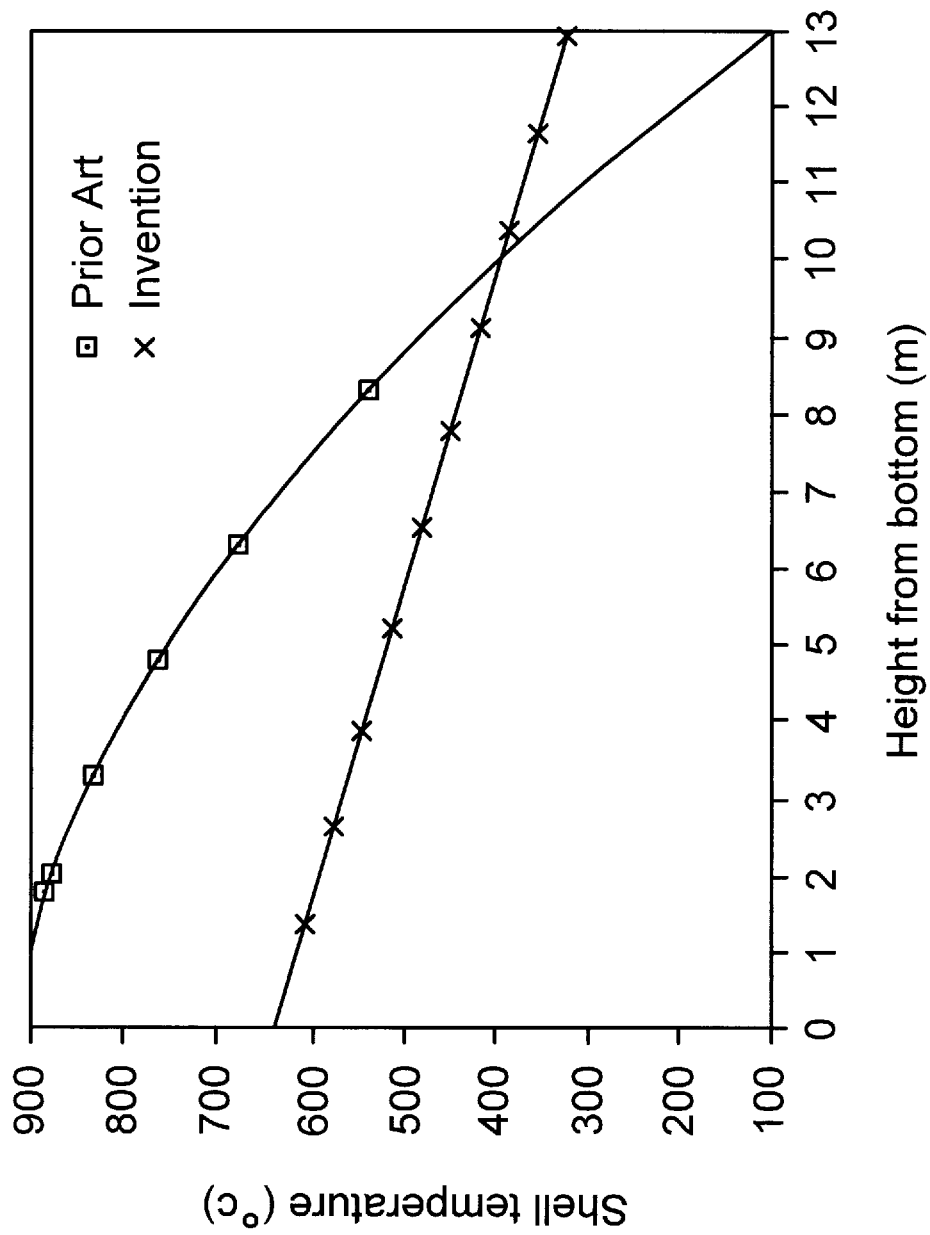
FIG. 4 shows a graph representing the shell temperature in the heat exchanger according to FIGS. 2 and 3, respectively.

Further, the thermal stresses on the loaded outer shell has been substantially reduced. In FIG. 4 it is shown how, according to prior art (FIG. 2), the temperature of the shell at the bottom amounts to 900° C., and then decreases upwards to about 100° C. at a height of 13 m. These temperatures have now been substantially reduced thanks to the unloaded inner shell, so that a maximal temperature of only about 640° C. is obtained adjacent to the bottom, see again FIG. 4.

Furthermore, due to the double shell wall construction, it has become possible to preheat the combustion air to temperature as high as 900° C. or even 1000° C., which was not possible in the prior art.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed:

1. A combination of a heat exchanger and a carbon black-producing combustion reactor, the heat exchanger comprising:

a cylindrical wall structure defining a center axis extending in a longitudinal direction and having first and second end portions connected respectively to first and second end walls spaced apart in the longitudinal direction for forming a chamber, the cylindrical wall structure being hollow and forming an air passage extending longitudinally outside of the chamber for conducting an air flow; and a plurality of tubes connected to the combustion reactor for conducting carbon black therefrom and extending in the longitudinal direction within the chamber for conducting carbon black from the first end wall to the second end wall, with the first end portion of the cylindrical wall structure being hotter than the second end portion thereof;

the cylindrical wall structure having an air inlet connected to the air passage adjacent to the first end wall for receiving the air flow, the air flow being cooler than the first end portion of the cylindrical wall structure for cooling the first end portion of the cylindrical wall structure upon entering the air inlet;

the air passage connecting with the chamber adjacent to the second end wall such that the air flow is conducted through the air passage toward the chamber in heat exchange relationship with the cylindrical wall structure to be heated thereby;

the cylindrical wall structure including an air outlet connected to the chamber adjacent to the first end wall for discharging the air flow from the chamber, whereby the air flow travels through the chamber outside of the tubes in counterflow relationship to carbon black flowing through the tubes to be heated thereby.

2. The combination according to claim 1 wherein the wall structure includes radially spaced inner and outer wall sections forming the air passage therebetween.

3. The combination according to claim 2 further including a cylindrical shield situated between the inlet and the air passage for dispersing the air flow incoming through the inlet.

4. The combination according to claim 2 further including a manifold disposed outside of the chamber adjacent to the first end wall for conducting a cooling medium across ends of the tubes disposed adjacent to the first end wall.

5. The combination according to claim 2 wherein sleeves are mounted in the second end wall, ends of the tubes disposed adjacent to the second end wall are loosely disposed in the sleeves to permit thermal expansion and contraction of the tubes.

6. An apparatus comprising:

a burner having an entrance for combustion air and an entrance for fuel;

a combustion reactor communicating with the burner for generating carbon black-laden gas; and a heat exchanger comprising:

a cylindrical wall structure having first and second end portions connected respectively to first and second longitudinally spaced-apart end walls for forming a chamber, the cylindrical wall structure being hollow and forming an air passage extending longitudinally outside of the chamber for conducting combustion air;

a plurality of tubes connected to the combustion reactor for conducting carbon black-laden gas therefrom, the tubes extending longitudinally within the chamber for conducting carbon black-laden gas from the first end wall to the second end wall, with the first end portion of the cylindrical wall structure being hotter than the second end portion thereof;

the cylindrical wall structure having an air inlet connected to the air passage adjacent to the first end wall for receiving the combustion air, the combustion air being cooler than the first end portion of the cylindrical wall structure for cooling the first end portion of the cylindrical wall structure upon entering the air inlet;

the air passage connecting with the chamber adjacent the second end wall such that the combustion air is conducted through the air passage toward the chamber in heat exchange relationship with the cylindrical wall structure to be heated thereby;

the cylindrical wall structure including an air outlet connected to the chamber adjacent to the first end wall for discharging the combustion air from the chamber, whereby the combustion air travels through the chamber outside of the tubes in counterflow heat exchange relationship to carbon black-laden gas flowing through the tubes to be heated thereby and to the combustion air entrance of the burner so that the combustion air upstream of the combustion air entrance is heated.

7. The apparatus according to claim 6 wherein the wall structure includes radially spaced inner and outer wall sections forming the air passage therebetween.

* * * * *